(12) United States Patent
Gopalan

(10) Patent No.: US 9,372,726 B2
(45) Date of Patent: Jun. 21, 2016

(54) GANG MIGRATION OF VIRTUAL MACHINES USING CLUSTER-WIDE DEDUPLICATION

(71) Applicant: The Research Foundation for The State University of New York, Binghamton, NY (US)

(72) Inventor: Kartik Gopalan, Vestal, NY (US)

(73) Assignee: The Research Foundation for The State University of New York, Binghamton, NY (US)

(*) Notice: Subject to any disclaimer, the term of this patent is extended or adjusted under 35 U.S.C. 154(b) by 210 days.

(21) Appl. No.: 14/137,131

(22) Filed: Dec. 20, 2013

(65) Prior Publication Data

US 2014/0196037 A1    Jul. 10, 2014

Related U.S. Application Data

(60) Provisional application No. 61/750,450, filed on Jan. 9, 2013.

(51) Int. Cl.
*G06F 9/455* (2006.01)
*G06F 9/48* (2006.01)

(52) U.S. Cl.
CPC .................... *G06F 9/4856* (2013.01)

(58) Field of Classification Search
None
See application file for complete search history.

(56) References Cited

U.S. PATENT DOCUMENTS

| | | | |
|---|---|---|---|
| 7,702,660 B2 | 4/2010 | Chan et al. | |
| 7,814,142 B2 | 10/2010 | Mamou et al. | |
| 7,814,470 B2 | 10/2010 | Mamou et al. | |
| 8,041,760 B2 | 10/2011 | Mamou et al. | |
| 8,046,550 B2 | 10/2011 | Feathergill | |
| 8,060,476 B1 | 11/2011 | Afonso et al. | |
| 8,060,553 B2 | 11/2011 | Mamou et al. | |
| 8,135,930 B1 | 3/2012 | Mattox et al. | |
| 8,166,265 B1 | 4/2012 | Feathergill | |
| 8,209,506 B2 | 6/2012 | Yueh | |
| 8,239,584 B1 | 8/2012 | Rabe et al. | |
| 8,285,681 B2 | 10/2012 | Prahlad et al. | |
| 8,307,177 B2 | 11/2012 | Prahlad et al. | |
| 8,307,359 B1 | 11/2012 | Brown et al. | |
| 8,311,985 B2 | 11/2012 | O'Keefe et al. | |
| 8,332,689 B2 | 12/2012 | Timashev et al. | |

(Continued)

OTHER PUBLICATIONS

Kartik Gopalan; MemX Virtualization of Cluster-wide Memory; 2010; IEEE; 39th International conference; all pages;.*

*Primary Examiner* — Dong Kim
(74) *Attorney, Agent, or Firm* — Steven M. Hoffberg, Esq.; Ostrolenk Faber LLP

(57) ABSTRACT

Datacenter clusters often employ live virtual machine (VM) migration to efficiently utilize cluster-wide resources. Gang migration refers to the simultaneous live migration of multiple VMs from one set of physical machines to another in response to events such as load spikes and imminent failures. Gang migration generates a large volume of network traffic and can overload the core network links and switches in a data center. The present technology reduces the network overhead of gang migration using global deduplication (GMGD). GMGD identifies and eliminates the retransmission of duplicate memory pages among VMs running on multiple physical machines in the cluster. A prototype GMGD reduces the network traffic on core links by up to 51% and the total migration time of VMs by up to 39% when compared to the default migration technique in QEMU/KVM, with reduced adverse performance impact on network-bound applications.

20 Claims, 7 Drawing Sheets

(56) References Cited

U.S. PATENT DOCUMENTS

| | | |
|---|---|---|
| 8,335,902 B1 | 12/2012 | Feathergill |
| 8,375,003 B1 | 2/2013 | Afonso et al. |
| 8,402,306 B1 | 3/2013 | Kruck et al. |
| 8,402,309 B2 | 3/2013 | Timashev et al. |
| 8,407,190 B2 | 3/2013 | Prahlad et al. |
| 8,407,428 B2 | 3/2013 | Cheriton et al. |
| 8,413,146 B1 | 4/2013 | McCorkendale et al. |
| 8,429,307 B1 | 4/2013 | Faibish et al. |
| 8,429,360 B1 | 4/2013 | Iyer et al. |
| 8,429,649 B1 | 4/2013 | Feathergill et al. |
| 8,429,651 B2 | 4/2013 | Donnellan et al. |
| 8,433,682 B2 | 4/2013 | Ngo |
| 8,442,955 B2 | 5/2013 | Al Kiswany et al. |
| 8,452,731 B2 | 5/2013 | Preslan et al. |
| 8,452,932 B2 | 5/2013 | Pangal et al. |
| 8,453,031 B2 | 5/2013 | Bates et al. |
| 8,463,991 B2 | 6/2013 | Colgrove et al. |
| 8,484,249 B1 | 7/2013 | Soundararajan et al. |
| 8,484,356 B1 | 7/2013 | Douglis et al. |
| 8,484,505 B1 | 7/2013 | Dutch et al. |
| 8,489,744 B2 | 7/2013 | Elyashev et al. |
| 8,504,670 B2 | 8/2013 | Wu et al. |
| 8,504,791 B2 | 8/2013 | Cheriton et al. |
| 8,504,870 B2 | 8/2013 | Dutch et al. |
| 8,516,158 B1 | 8/2013 | Wu et al. |
| 8,527,544 B1 | 9/2013 | Colgrove et al. |
| 8,533,231 B2 | 9/2013 | Aizman et al. |
| 8,549,245 B2 | 10/2013 | Yueh |
| 8,549,350 B1 | 10/2013 | Dutch et al. |
| 8,549,518 B1 | 10/2013 | Aron et al. |
| 8,554,918 B1 | 10/2013 | Douglis |
| 8,566,640 B2 | 10/2013 | Timashev et al. |
| 8,577,918 B2 | 11/2013 | Collins et al. |
| 8,589,640 B2 | 11/2013 | Colgrove et al. |
| 8,595,191 B2 | 11/2013 | Prahlad et al. |
| 8,595,346 B2 | 11/2013 | Bairavasundaram et al. |
| 8,595,460 B2 | 11/2013 | Bhat et al. |
| 8,600,947 B1 | 12/2013 | Freiheit et al. |
| 8,601,473 B1 | 12/2013 | Aron et al. |
| 8,612,439 B2 | 12/2013 | Prahlad et al. |
| 2005/0222931 A1 | 10/2005 | Mamou et al. |
| 2005/0223109 A1 | 10/2005 | Mamou et al. |
| 2005/0228808 A1 | 10/2005 | Mamou et al. |
| 2005/0232046 A1 | 10/2005 | Mamou et al. |
| 2005/0234969 A1 | 10/2005 | Mamou et al. |
| 2005/0235274 A1 | 10/2005 | Mamou et al. |
| 2005/0240354 A1 | 10/2005 | Mamou et al. |
| 2005/0240592 A1 | 10/2005 | Mamou et al. |
| 2005/0262188 A1 | 11/2005 | Mamou et al. |
| 2005/0262189 A1 | 11/2005 | Mamou et al. |
| 2005/0262190 A1 | 11/2005 | Mamou et al. |
| 2005/0262191 A1 | 11/2005 | Mamou et al. |
| 2005/0262192 A1 | 11/2005 | Mamou et al. |
| 2005/0262193 A1 | 11/2005 | Mamou et al. |
| 2005/0262194 A1 | 11/2005 | Mamou et al. |
| 2006/0010195 A1 | 1/2006 | Mamou et al. |
| 2006/0069717 A1 | 3/2006 | Mamou et al. |
| 2009/0240737 A1 | 9/2009 | Hardisty et al. |
| 2010/0011368 A1 | 1/2010 | Arakawa et al. |
| 2010/0070528 A1 | 3/2010 | Collins et al. |
| 2010/0070725 A1 | 3/2010 | Prahlad et al. |
| 2010/0106691 A1 | 4/2010 | Preslan et al. |
| 2010/0241654 A1 | 9/2010 | Wu et al. |
| 2010/0241673 A1 | 9/2010 | Wu et al. |
| 2010/0241726 A1 | 9/2010 | Wu |
| 2010/0241807 A1 | 9/2010 | Wu et al. |
| 2010/0274772 A1 | 10/2010 | Samuels |
| 2010/0332401 A1 | 12/2010 | Prahlad et al. |
| 2010/0332454 A1 | 12/2010 | Prahlad et al. |
| 2010/0332456 A1 | 12/2010 | Prahlad et al. |
| 2010/0332479 A1 | 12/2010 | Prahlad et al. |
| 2010/0332657 A1 | 12/2010 | Elyashev et al. |
| 2010/0332658 A1 | 12/2010 | Elyashev |
| 2010/0332818 A1 | 12/2010 | Prahlad et al. |
| 2010/0333116 A1 | 12/2010 | Prahlad et al. |
| 2011/0087874 A1 | 4/2011 | Timashev et al. |
| 2011/0131568 A1* | 6/2011 | Heim ................ 718/1 |
| 2011/0161291 A1 | 6/2011 | Taleck et al. |
| 2011/0161295 A1 | 6/2011 | Ngo |
| 2011/0161297 A1 | 6/2011 | Parab |
| 2011/0161299 A1 | 6/2011 | Prahlad et al. |
| 2011/0161723 A1 | 6/2011 | Taleck et al. |
| 2011/0167221 A1 | 7/2011 | Pangal et al. |
| 2011/0179415 A1 | 7/2011 | Donnellan et al. |
| 2011/0238775 A1 | 9/2011 | Wu et al. |
| 2011/0270945 A1* | 11/2011 | Shiga et al. .................. 709/213 |
| 2011/0283278 A1* | 11/2011 | Murrell et al. ............... 718/1 |
| 2012/0011176 A1 | 1/2012 | Aizman |
| 2012/0017027 A1 | 1/2012 | Baskakov et al. |
| 2012/0017114 A1 | 1/2012 | Timashev et al. |
| 2012/0079189 A1 | 3/2012 | Colgrove et al. |
| 2012/0079190 A1 | 3/2012 | Colgrove et al. |
| 2012/0079318 A1 | 3/2012 | Colgrove et al. |
| 2012/0084261 A1 | 4/2012 | Parab |
| 2012/0084262 A1 | 4/2012 | Dwarampudi et al. |
| 2012/0084270 A1 | 4/2012 | Jayaraman et al. |
| 2012/0084504 A1 | 4/2012 | Colgrove et al. |
| 2012/0084505 A1 | 4/2012 | Colgrove et al. |
| 2012/0084506 A1 | 4/2012 | Colgrove et al. |
| 2012/0084507 A1 | 4/2012 | Colgrove et al. |
| 2012/0084527 A1 | 4/2012 | Jayaraman et al. |
| 2012/0084595 A1 | 4/2012 | Dutch et al. |
| 2012/0089764 A1 | 4/2012 | Baskakov et al. |
| 2012/0102455 A1 | 4/2012 | Ambat et al. |
| 2012/0173732 A1 | 7/2012 | Sullivan |
| 2012/0213069 A1 | 8/2012 | Oguchi |
| 2012/0239871 A1 | 9/2012 | Badam et al. |
| 2012/0240110 A1 | 9/2012 | Breitgand et al. |
| 2012/0254119 A1 | 10/2012 | Kumarasamy et al. |
| 2012/0284236 A1 | 11/2012 | Timashev et al. |
| 2012/0290950 A1 | 11/2012 | Rapaport et al. |
| 2012/0331021 A1 | 12/2012 | Lord |
| 2013/0024424 A1 | 1/2013 | Prahlad et al. |
| 2013/0024645 A1 | 1/2013 | Cheriton et al. |
| 2013/0031331 A1 | 1/2013 | Cheriton et al. |
| 2013/0031563 A1 | 1/2013 | Skowron et al. |
| 2013/0041872 A1 | 2/2013 | Aizman et al. |
| 2013/0042052 A1 | 2/2013 | Colgrove et al. |
| 2013/0046949 A1 | 2/2013 | Colgrove et al. |
| 2013/0054545 A1 | 2/2013 | Anglin et al. |
| 2013/0054888 A1 | 2/2013 | Bhat et al. |
| 2013/0054889 A1 | 2/2013 | Vaghani et al. |
| 2013/0054890 A1 | 2/2013 | Desai et al. |
| 2013/0054906 A1 | 2/2013 | Anglin et al. |
| 2013/0054910 A1 | 2/2013 | Vaghani et al. |
| 2013/0054927 A1 | 2/2013 | Raj et al. |
| 2013/0054932 A1 | 2/2013 | Acharya et al. |
| 2013/0055248 A1 | 2/2013 | Sokolinski et al. |
| 2013/0055249 A1 | 2/2013 | Vaghani et al. |
| 2013/0061014 A1 | 3/2013 | Prahlad et al. |
| 2013/0080408 A1 | 3/2013 | Cashman et al. |
| 2013/0080728 A1 | 3/2013 | Cashman et al. |
| 2013/0086006 A1 | 4/2013 | Colgrove et al. |
| 2013/0086269 A1 | 4/2013 | Bairavasundaram et al. |
| 2013/0086353 A1 | 4/2013 | Colgrove et al. |
| 2013/0097377 A1 | 4/2013 | Satoyama et al. |
| 2013/0097380 A1 | 4/2013 | Colgrove et al. |
| 2013/0110778 A1 | 5/2013 | Taylor et al. |
| 2013/0110779 A1 | 5/2013 | Taylor et al. |
| 2013/0110793 A1 | 5/2013 | Chavda et al. |
| 2013/0111262 A1 | 5/2013 | Taylor et al. |
| 2013/0117240 A1 | 5/2013 | Taylor et al. |
| 2013/0121209 A1 | 5/2013 | Padmanabhan et al. |
| 2013/0125120 A1 | 5/2013 | Zhang et al. |
| 2013/0132531 A1 | 5/2013 | Koponen et al. |
| 2013/0132967 A1 | 5/2013 | Soundararajan et al. |
| 2013/0138705 A1 | 5/2013 | Agetsuma et al. |
| 2013/0151484 A1 | 6/2013 | Kruglick |
| 2013/0159645 A1 | 6/2013 | Anglin et al. |
| 2013/0159648 A1 | 6/2013 | Anglin et al. |
| 2013/0198459 A1 | 8/2013 | Joshi et al. |
| 2013/0212200 A1 | 8/2013 | Dennis et al. |
| 2013/0212437 A1 | 8/2013 | Timashev et al. |
| 2013/0227352 A1 | 8/2013 | Kumarasamy et al. |

(56) References Cited

U.S. PATENT DOCUMENTS

| | | |
|---|---|---|
| 2013/0232215 A1 | 9/2013 | Gupta et al. |
| 2013/0238562 A1 | 9/2013 | Kumarasamy et al. |
| 2013/0238563 A1 | 9/2013 | Amarendran et al. |
| 2013/0238572 A1 | 9/2013 | Prahlad et al. |
| 2013/0238575 A1 | 9/2013 | Amarendran et al. |
| 2013/0246360 A1 | 9/2013 | Ngo |
| 2013/0246366 A1 | 9/2013 | Preslan et al. |
| 2013/0253977 A1 | 9/2013 | Vibhor et al. |
| 2013/0254402 A1 | 9/2013 | Vibhor et al. |
| 2013/0262385 A1 | 10/2013 | Kumarasamy et al. |
| 2013/0262386 A1 | 10/2013 | Kottomtharayil et al. |
| 2013/0262390 A1 | 10/2013 | Kumarasamy et al. |
| 2013/0262392 A1 | 10/2013 | Vibhor et al. |
| 2013/0262394 A1 | 10/2013 | Kumarasamy et al. |
| 2013/0262396 A1 | 10/2013 | Kripalani et al. |
| 2013/0262410 A1 | 10/2013 | Liu et al. |
| 2013/0262615 A1 | 10/2013 | Ankireddypalle et al. |
| 2013/0262638 A1 | 10/2013 | Kumarasamy et al. |
| 2013/0262801 A1 | 10/2013 | Sancheti et al. |
| 2013/0263289 A1 | 10/2013 | Vijayan et al. |
| 2013/0282662 A1 | 10/2013 | Kumarasamy et al. |
| 2013/0290267 A1 | 10/2013 | Dwarampudi et al. |
| 2013/0297854 A1 | 11/2013 | Gupta et al. |
| 2013/0297855 A1 | 11/2013 | Gupta et al. |
| 2013/0315260 A1 | 11/2013 | Adiraju et al. |
| 2013/0318051 A1 | 11/2013 | Kumar et al. |
| 2013/0318526 A1* | 11/2013 | Conrad et al. .................. 718/1 |
| 2013/0326159 A1 | 12/2013 | Vijayan et al. |
| 2013/0326260 A1 | 12/2013 | Wei et al. |
| 2013/0332660 A1 | 12/2013 | Talagala et al. |
| 2013/0332685 A1 | 12/2013 | Kripalani et al. |
| 2013/0339298 A1 | 12/2013 | Muller et al. |
| 2013/0339299 A1 | 12/2013 | Muller et al. |
| 2013/0339300 A1 | 12/2013 | Muller et al. |
| 2013/0339310 A1 | 12/2013 | Muller et al. |
| 2013/0339390 A1 | 12/2013 | Muller et al. |
| 2013/0339407 A1 | 12/2013 | Sharpe et al. |

\* cited by examiner

GANG MIGRATION OF VIRTUAL MACHINES USING CLUSTER-WIDE DEDUPLICATION

STATEMENT OF GOVERNMENT SUPPORT

This invention was made with government support under award 0845832 awarded by the National Science Foundation. The government has certain rights in this invention.

BACKGROUND OF THE INVENTION

Live migration of virtual machines (VMs) is a critical activity in the operation of modern data centers. Live migration involves the transfer of multiple Gigabytes of memory within a short duration (assuming that network attached storage is used, which does not require migration) and can consequently consume significant amounts of network and CPU resources.

An administrator may need to simultaneously migrate multiple VMs to perform resource re-allocation to handle peak workloads, imminent failures, cluster maintenance, or powering down an entire rack to save energy, Simultaneous live migration of multiple VMs is referred to as gang migration [8]. Gang migration is a network intensive activity that can cause an adverse cluster-wide impact by overloading the core links and switches of the datacenter network. Gang migration can also affect the performance at the network edges where the migration traffic competes with the bandwidth requirements of applications within the VMs. Hence it is important to minimize the adverse performance impact of gang migration by reducing the total amount of data transmitted due to VM migration. Reducing the VM migration traffic can also lead to a reduction in the total time required to migrate multiple VMs.

Process migration has also been extensively researched. Numerous cluster job schedulers exist, as well as virtual machine management systems, such as VMWare's DRS, XenEnterprise, Usher, Virtual Machine Management Pack, and CoD that let administrators control jobs/VM placement based on cluster load or specific policies such as affinity or anti-affinity rules.

[27] optimizes the live migration of a single VM over wide-area network through a variant of stop-and-copy approach which reduces the number of memory copying iterations. [30] and [27] further use page-level deduplication along with the transfer of differences between dirtied, and original pages, eliminating the need to retransmit the entire dirtied page. [16] uses an adaptive page compression technique to optimize the live migration of a single VM. Post-copy [13] transfers every page to the destination only once, as opposed to the iterative pre-copy[20], [5], which transfers dirtied pages multiple times. [14] employs low-overhead RDMA over Infiniband to speed up the transfer of a single VM. [21] excludes the memory pages of processes communicating over the network from being transferred during the initial rounds of migration, thus limiting the total migration time. [29] shows that certain benchmarks used in high performance computing are likely to have large amounts of content sharing. The work focuses mainly on the opportunity and feasibility of exploiting content sharing, but does not provide an implementation of an actual migration mechanism using this observation, nor does it evaluate the migration time or network traffic reduction. Shrinker[22] migrates virtual clusters over high-delay links of WAN. It uses an online hashing mechanism in which hash computation for identifying duplicate pages (a CPU-intensive operation) is performed during the migration.

The following US patents and published patent applications are expressly incorporated herein in their entirety: 20130339407; 20130339390; 20130339310; 20130339300; 20130339299; 20130339298; 20130332685; 20130332660; 20130326260; 20130326159; 20130318051; 20130315260; 20130297855; 20130297854; 20130290267; 20130282662; 20130263289; 20130262801; 20130262638; 20130262615; 20130262410; 20130262396; 20130262394; 20130262392; 20130262390; 20130262386; 20130262385; 20130254402; 20130253977; 20130246366; 20130246360; 20130238575; 20130238572; 20130238563; 20130238562; 20130232215; 20130227352; 20130212437; 20130212200; 20130198459; 20130159648; 20130159645; 20130151484; 20130138705; 20130132967; 20130132531; 20130125120; 20130121209; 20130117240: 20130111262; 20130110793; 20130110779: 20130110778; 20130097380; 20130097377; 20130086353; 20130086269; 20130086006; 20130080728; 20130080408; 20130061014; 20130055249; 20130055248; 20130054932; 20130054927; 20130054910; 20130054906; 20130054890; 20130054889; 20130054888; 20130054545; 20130046949; 20130042052; 20130041872; 20130031563; 20130031331; 20130024645; 20130024424; 20120331021; 20120290950; 20120284236; 20120254119; 20120240110; 20120239871; 20120213069; 20120102455; 20120089764; 20120084595; 20120084527; 20120084507; 20120084506; 20120084505; 20120084504; 20120084270; 20120084262; 20120084261; 20120079318; 20120079190; 20120079189; 20120017114; 20120017027; 20120011176; 20110238775: 20110179415; 20110167221; 20110161723: 20110161299; 20110161297; 20110161295; 20110161291; 20110087874; 20100333116; 20100332818; 20100332658; 20100332657; 20100332479; 20100332456; 20100332454; 20100332401; 20100274772; 20100241807; 20100241726; 20100241673; 20100241654; 20100106691; 20100070725; 20100070528; 20100011368; 20090240737; 20060069717; 20060010195; 20050262194; 20050262193; 20050262192; 20050262191; 20050262190; 20050262189; 20050262188; 20050240592; 20050240354; 20050235274; 20050234969; 20050232046; 20050228808; 20050223109; 20050222931; U.S. Pat. Nos. 8,612,439; 8.601,473; 8,600,947; 8,595,460; 8,595,346; 8,595,191; 8,589,640; 8,577,918; 8,566,640; 8,554,918; 8,549,518; 8,549,350; 8,549,245; 8,533,231; 8,527,544; 8,516,158; 8,504,870; 8,504,791; 8,504,670; 8,489,744; 8,484,505; 8,484,356; 8,484,249; 8,463,991; 8,453,031; 8,452,932; 8,452,731; 8,442,955; 8,433,682; 8,429,651; 8,429,649; 8,429,360; 8,429,307; 8,413,146; 8,407,428; 8,407,190; 8,402,309; 8,402,306; 8,375,003; 8,335,902; 8,332,689; 8,311,985; 8,307,359; 8,307,177; 8,285,681; 8,239,584; 8,209,506; 8,166,265; 8,135,930; 8,060,553; 8,060,476; 8,046,550; 8,041,760; 7,814,470; and 7,814,142.

SUMMARY OF THE INVENTION

The present technology provides, for example, live gang migration of multiple VMs that run on multiple physical machines, which may be in a cluster or separated by a local area network or wide area network. A cluster is assumed to have a high-bandwidth low-delay interconnect such has Gigabit Ethernet[10], 10 GigE[9], or Infiniband[15]. Wide Area Networks tend to have lower throughput, lower communications reliability, and higher latency than communications within a cluster. One approach to reducing the network traffic due to gang migration uses the following observation. VMs within a cluster often have similar memory content, given that they may execute the same operating system, libraries, and applications. Hence, a significant number of their memory pages may be identical[25]. Similarly, VMs communicating over less constrained networks may also share memory content.

One can reduce the network overhead of gang migration using deduplication, i.e. by avoiding the transmission of duplicate copies of identical pages. One approach is called gang migration using global deduplication (GMGD), which performs deduplication during the migration of VMs that run on different physical machines. In contrast, gang migration using local deduplication (GMLD) refers to deduplicating the migration of VMs running within a single host[8].

Various aspects which may be used include: A technique to identify and track identical memory content across VMs running on different physical machines in a cluster, including non-migrating VMs running on the target machines; and a technique to deduplicate this identical memory content during the simultaneous live migration of multiple VMs, while keeping the coordination overhead low.

For example, an implementation of GMGD may be provided on the QEMU/KVM[18] platform. A quantitative evaluation of GMGD on a 30 node cluster test bed having 10 GigE core links and 1 Gbps edge links was performed, comparing GMGD against two techniques—the QEMU/KVM's default live migration technique, called online compression (OC), and GMLD.

Prior efforts to reduce the data transmitted during VM migration have focused on live migration of a single VM[5], [20], [13], [16], live migration of multiple VMs running on the same physical machine (GMLD) [8], live migration of a virtual cluster across a wide-area network (WAN)[22], or non-live migration of multiple VM images across a WAN [17]. Compared to GMLD, GMGD faces the additional challenge of ensuring that the cost of global deduplication does not exceed the benefit of network traffic reduction during the live migration. The deduplication cost may be calculated, inferred or presumed. In contrast to migration over a WAN, which has high-bandwidth high-delay links, migration within a datacenter LAN has high-bandwidth low-delay links. This difference is important because hash computations, which are used to identify and deduplicate identical memory pages, are CPU-intensive operations. When migrating over a LAN, hash computations become a serious bottleneck if performed on line during migration, whereas over a WAN, the large round-trip latency can mask the online hash computation overhead.

First, a distributed duplicate tracking phase identifies and tracks identical memory content across VMs running on same/different physical machines in a cluster, inducting non-migrating VMs running on the target machines. The key challenge here is a distributed indexing mechanism that computes content hashes on VMs' memory content on different machines and allows individual nodes to efficiently query and locate identical pages. Two options are a distributed hash table or a centralized indexing server, both of which have their relative merits and drawbacks. The former prevents a single point of bottleneck/failure, whereas the latter simplifies the overall indexing and lookup operation during runtime.

Secondly, a distributed deduplication phase, during the migration phase, avoids the need for re-transmission of identical memory content, that was identified in the first step, during the simultaneous live migration of multiple VMs. The goal here is to reduce the network traffic generated by migration of multiple VMs by eliminating the retransmission of identical pages from different VMs. Note that the deduplication operation would itself introduce control traffic to identify which identical pages have already been transferred from the source to the target racks. This control traffic overhead is minimized, in terms of both additional bandwidth and latency introduced due to synchronization. Deduplication has been used to reduce the memory footprint of VMs in[3],[25],[19], [1],[28] and[11]. These techniques use deduplication to reduce memory consumption either within a single VM or between multiple co-located VMs. In contrast, the present technology uses cluster-wide deduplication across multiple physical machines to reduce the network traffic overhead when simultaneously migrating multiple VMs. Non-live migration of a single VM can be speeded up by using content hashing to detect blocks within the VM image that are already present at the destination[23]. VMFlock[17] speeds up the non-live migration of a group of VM images over a high-bandwidth high-delay wide-area network by deduplicating blocks across the VM images. In contrast, one embodiment of the present technology focuses on reducing the network performance impact of the live and simultaneous migration of the memories of multiple VMs within a high-bandwidth low-delay datacenter network. The technology can of course be extended outside of these presumptions.

In the context of live migration of multiple VMs, GMLD[8] deduplicates the transmission of identical memory content among VMs co-located within a single host. It also exploits sub-page level &duplication, page similarity, and delta difference for dirtied pages, all of which can be integrated in GMGD.

The large round-trip latency of WAN links masks the high hash computation overhead during migration, and therefore makes online hashing feasible. Over low-delay links, e.g., Gigabit Ethernet LAN, offline hashing appears preferable.

Gang migration with global deduplication (GMGD) provides a solution to reduce the network load resulting from the simultaneous live migration of multiple VMs within a datacenter that has high-bandwidth low-latency interconnect, and has implications for other environments. The technology employs cluster-wide deduplication to identify, track, and avoid the retransmission of pages that have identical content. Evaluations of a GMGD prototype on a 30 node cluster show that GMGD reduces the amount of data transferred over the core links during migration by up to 51% and the total migration time by up to 39% compared to online compression. A similar technology may be useful for sub-page-level deduplication, which advantageously would reduce the amount of data that needs to be transferred. Ethernet multicast may also be used to reduce the amount of data that needs to be transmitted.

Although we describe GMGD in the context of its use within a single datacenter for clarity, GMGD can also be used for migration of multiple VMs between multiple datacenters across a wide-area network (WAN). The basic operation of GMGD over a WAN remains the same.

Compared to existing approaches that use online hashing/compression, GMGD uses an offline duplicate tracking phase. This would in fact eliminate the computational overhead of hash computation during the migration of multiple VMs over the WAN and improve the overall performance applications that execute within the VMs.

Furthermore, as WAN link latencies reduce further, the cost of performing online hash computation (i.e. during migration) for large number of VMs would continue to increase. This would make GMGD more attractive due to its use of offline duplicate tracking phase.

It is therefore an object to provide a system and method for gang migration with global deduplication, comprising: providing a datacenter comprising a plurality of virtual machines in a cluster defined by a set of information residing in a first storage medium, the cluster communicating through at least one data communication network; performing cluster-wide deduplication of the plurality of virtual machines to identify redundant memory pages of the first storage medium representing the respective virtual machines that have corresponding content;

initiating a simultaneous live migration of the plurality of virtual machines in the cluster, by communicating information sufficient to reconstitute the plurality of virtual machines in a cluster defined by the set of information residing in a second storage medium, through the at least one data communication network; based on the identification of the redundant memory pages having corresponding content, selectively communicating information representing the unique memory pages of the first storage medium through the at least one communication network to the second storage medium, substantially without communicating all of the memory pages of the first storage medium; and subsequent to communication through the at least one communication network, duplicating the redundant memory pages of the first storage medium in the second storage medium selectively dependent on the identified redundant memory pages, to reconstitute the plurality of virtual machines in the second storage medium.

It is also an object to provide a system for gang migration with global deduplication, in a datacenter comprising a plurality of virtual machines in a cluster defined by a set of information residing in a first storage medium, the cluster communicating through at least one data communication network, comprising: at least one processor configured to perform cluster-wide deduplication of the plurality of virtual machines to identify redundant memory pages of the first storage medium representing the respective virtual machines that have corresponding content; at least one communication link configured to communicate a simultaneous live migration of the plurality of virtual machines in the cluster, by communicating information sufficient to reconstitute the plurality of virtual machines in a cluster defined by the set of information residing in a second storage medium, through the at least one data communication network: the at least one processor being further configured, based on the identification of the redundant memory pages having corresponding content, to selectively communicate information representing the unique memory pages of the first storage medium through the at least one communication network to the second storage medium, substantially without communicating all of the memory pages of the first storage medium, and subsequently to communicate through the at least one communication network, duplicating the redundant memory pages of the first storage medium in the second storage medium selectively dependent on the identified redundant memory pages, to reconstitute the plurality of virtual machines in the second storage medium.

It is a still further object to provide a method for migration of virtual machines with global &duplication, comprising: providing a plurality of virtual machines at a local facility, defined by a set of stored information comprising redundant portions, the network being interconnected with a wide area network; identifying at least a subset of the redundant portions of the stored information; initiating a simultaneous live migration of the plurality of virtual machines by communicating through the wide area network to the remote location data sufficient to reconstitute the set of stored information comprising the identification of the subset of the elements of the redundant portions and the set of stored information less redundant ones of the subset of the redundant portions of the stored information; receiving at a remote location the data sufficient to reconstitute the set of stored information; duplicating the subset of the redundant portions of the stored information to reconstitute the set of stored information defining the plurality of virtual machines; and transferring an active status to the reconstituted plurality of virtual machines at the remote location The identification of redundant portions or pages of memory is advantageously performed using a hash table, which can be supplemented with a dirty or delta table, such that the hash values need not all be recomputed in real time. A hash value of memory portion which remains unchanged can be computed once, and so long as it remains unchanged, the hash value maintained. Hash values of pages or portions which change dynamically can be recomputed as necessary.

DETAILED DESCRIPTION OF THE PREFERRED EMBODIMENTS

Architecture

Figure 1:
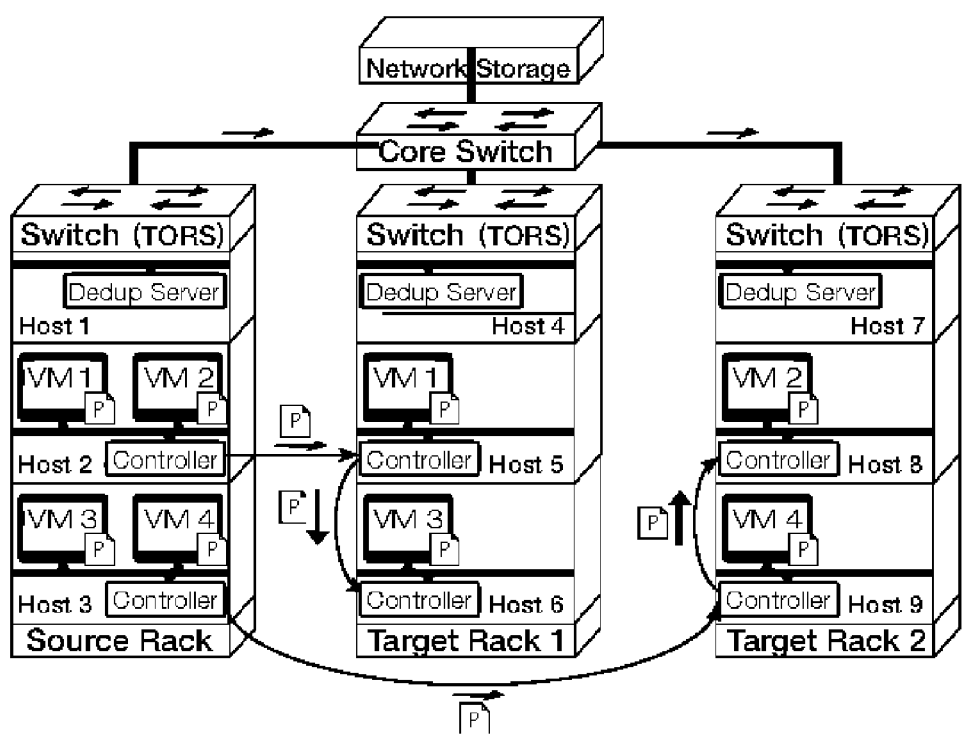
FIG. 1 shows an illustration of GMGD.

The high-level architecture of GMGD is shown with respect to FIG. 1.

For simplicity of exposition, we first describe how GMGD operates when VMs are live migrated from one rack of machines to another rack, followed by a description of its operation in the general case. For each VM being migrated, the target physical machine is provided as an input to GMGD. Target mapping of VMs could be provided by another VM placement algorithm that maximizes some optimization criteria such as reducing inter-VM communication overhead [26] or maximizing the memory sharing potential[28]. GMGD does not address the VM placement problem nor does it make any assumptions about the lack or presence of inter-VM dependencies.

As shown in FIG. 1, a typical cluster consists of multiple racks of physical machines. Page P is identical among all four VMs at the source rack. VM1 and VM3 are being migrated to target rack 1. VM2 and VM4 are being migrated to target rack 2. One copy of P is sent to host 5 which forwards P to host 6 in target rack 1. Another copy of P is sent to host 8 which forwards P to host 9 in target rack 2. Thus identical pages headed for the same target rack are sent only once per target rack over the core network, reducing network traffic overhead.

Machines within a rack are connected to a top-of-the-rack (TOR) switch. TOR switches are connected to one or more core switches using high-bandwidth links (typically 10 Gbps or higher). GMGD does not preclude the use of other layouts where the core network could become overloaded. Migrating VMs from one rack to another increases the network traffic overhead on the core links. To reduce this overhead, GMGD employs a cluster-wide deduplication mechanism to identify and track identical pages across VMs running on different machines. As illustrated in FIG. 1, GMGD identifies the identical pages from VMs that are being migrated to the same target rack (or more generally, the same facility) and transfers only one copy of each identical page to the target rack. At the target rack, the first machine to receive the identical page transfers the page to other machines in the rack that also require the page. This prevents duplicate transfers of an identical page over the core network to the same target rack. GMGD can work with any live VM migration technique, such as pre-copy[5] or post-copy[13]. In the prototype system described below, GMGD was implemented within the default pre-copy mechanism in QEMU/KVM. GMGD has two phases, namely duplicate tracking and live migration.

Physical machines in enterprise clusters often have multiple network interface cards (NICs) to increase the network bandwidth available to each node. The availability of multiple NICs may be exploited to reduce the total migration time of live gang migration. The basic idea is that memory pages from each VM can be potentially be scattered during migration to multiple nodes at the target machine's rack. The scattered pages could then be gathered by the target machine through parallel transfers over multiple NICs. At the first look, this scatter-gather approach seems to introduce an additional hop in the page transfer between the source and the target. However, when scatter-gather operation is combined with distributed deduplication across multiple VMs, the performance advantages of the approach becomes apparent. In essence, pages with identical content on different VMs are scattered to the same machine on the target rack. Only the first copy of the identical page needs to be transferred, whereas subsequent pages are communicated via their unique identifiers (which includes VM's ID, target machine's ID, page offset and content hash).

A. Duplicate Tracking Phase

The Duplicate Tracking Phase is carried out during normal execution of VMs at the source machines, before the migration begins. Its purpose is to identify all duplicate memory content (e.g., at the page-level) across all VMs residing on different machines. Content hashing is used to detect identical pages. The pages having the same content yield the same hash value. When the hashing is performed using a standard 160-bit SHA1 hash[12], the probability of collision is less than the probability of a memory error, or an error in a TCP connection[4]. Of course, different hashing or memory page identification technologies might be used. For example, in some environments, static content is mapped to memory locations, in which case, the static content need only be identified, such as with a content vector. In other cases, especially where local processing capacity is available, a memory page which differs by a small amount from a reference page may be coded by its differences. Of course, other technologies which inferentially define the content of the memory can be used.

In each machine, a per-node controller process coordinates the tracking of identical pages among all VMs in the machine. The per-node controller instructs a user-level QEMU/KVM process associated with each VM to scan the VM's memory image, perform content based hashing and record identical pages. Since each VM is constantly executing, some of the identical pages may be modified (dirtied) by the VM, either during the hashing, or after its completion. To identify these dirtied pages, the controller uses the dirty logging mode of QEMU/KVM. In this mode, all VM pages are marked as read-only in the shadow page table maintained by the hypervisor. The first write attempt to any read-only page results in a trap into the hypervisor which marks the faulted page as dirty in its dirty bitmap and allows the write access to proceed. The QEMU/KVM process uses a hypercall to extract the dirty bitmap from KVM to identify the modified pages.

The per-rack deduplication servers maintain a hash table, which is populated by carrying out a rack-wide content hashing of the 160-bit hash values pre-computed by per-node controllers. Each hash is also associated with a list of hosts in the rack containing the corresponding pages. Before migration, all deduplication servers exchange the hash values and host list with other deduplication servers.

In some cases, data in memory is maintained even though the data structures corresponding to those memory pages are no longer in use. In order to avoid need for migration of such data, a table may be maintained of "in use" or "available" memory pages, and the migration limited to the live data structures or program code. In many cases, operating system resources already maintain such table(s), and therefore these need not be independently created or maintained.

B. Migration Phase

In this phase, all VMs are migrated in parallel to their destination machines. The pre-computed hashing information is used to perform the deduplication of the transferred pages at both the host and the rack levels. QEMU/KVM queries the deduplication server for its rack to acquire the status of each page. If the page has not been transferred already by another VM, then its status is changed to sent and it is transferred to the target QEMU/KVM. For subsequent instances of the same page from any other VM migrating to the same rack, QEMU/KVM transfers the page identifier. Deduplication servers also periodically exchange the information about the pages marked as sent, which allows the VMs in one rack to avoid retransmission of the pages that are already sent by the VMs from another rack.

C. Target-side VM Deduplication

The racks used as targets for VM migration are often not empty. They may host VMs containing pages that are identical to the ones being migrated into the rack. Instead of transferring such pages from the source racks via core links, they are forwarded within the target rack from the hosts running the VMs to the hosts receiving the migrating VMs. The deduplication server at the target rack monitors the pages within hosted VMs and synchronizes this information with other deduplication servers. Per-node controllers perform this forwarding of identical pages among hosts in the target rack.

D. Scatter-Gather VM Deduplication

Figure 9:
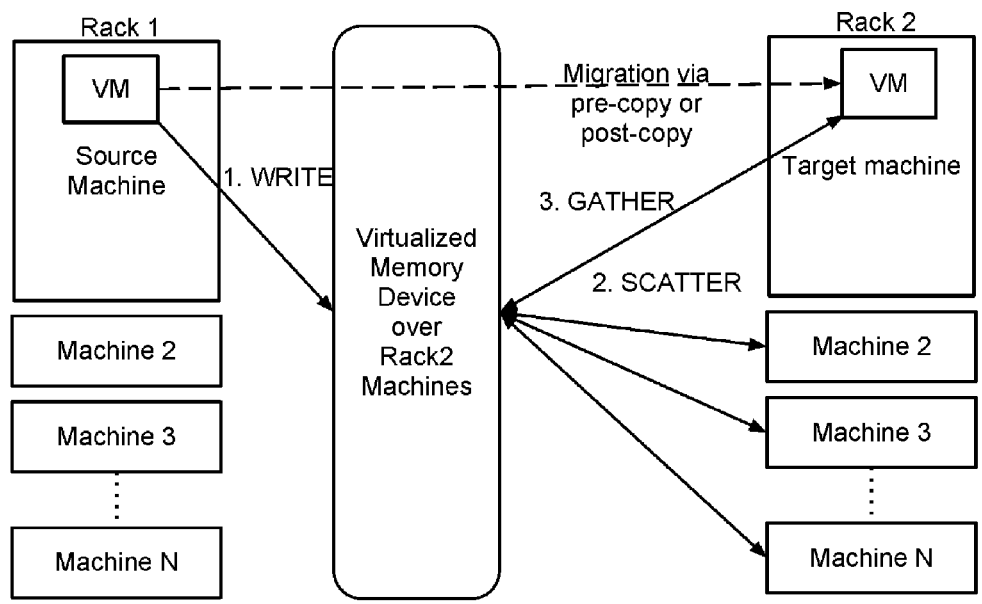
FIG. 9 illustrates the proposed scatter-gather based live VM migration.
Figure 10:
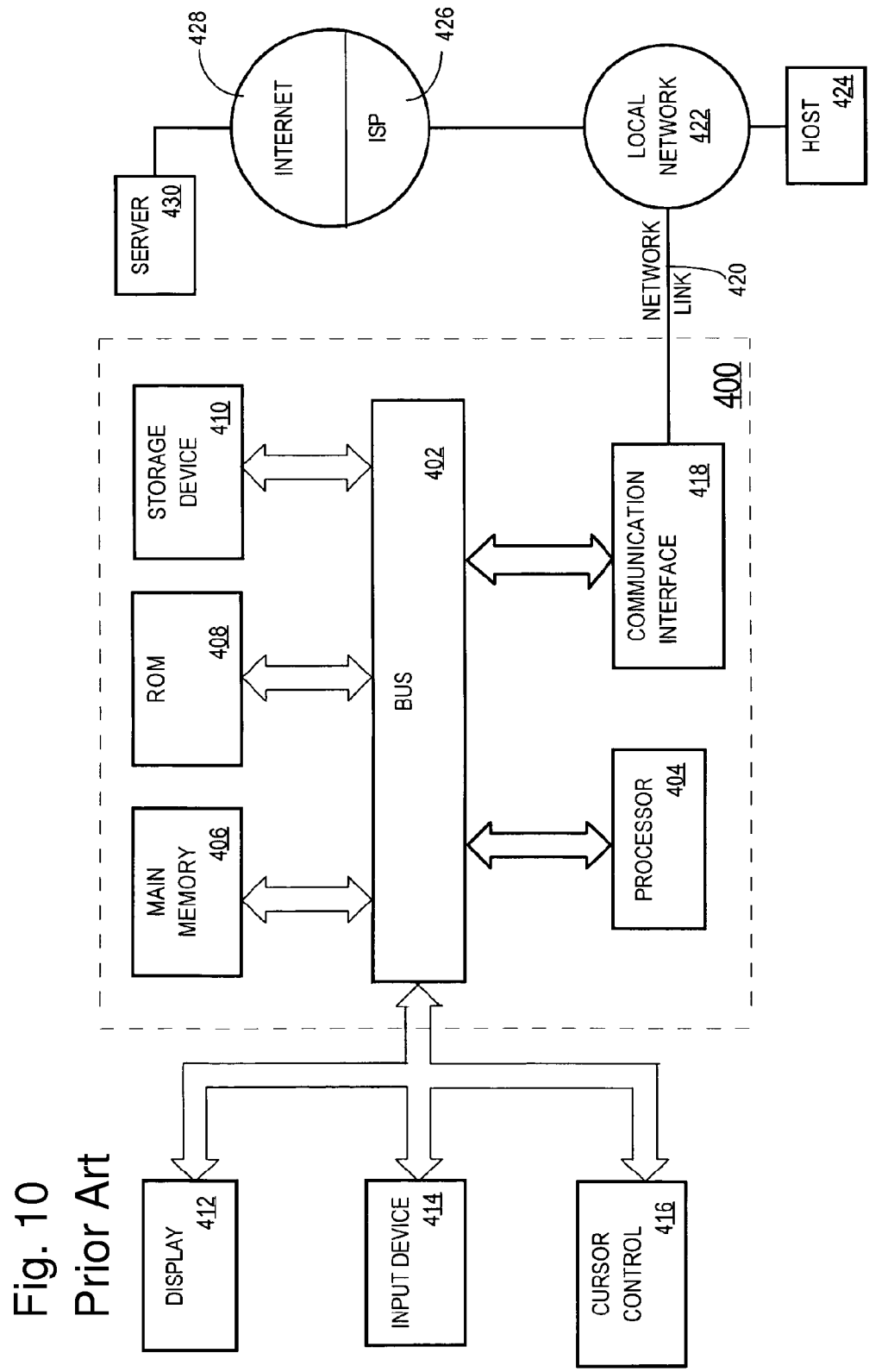
FIG. 10 shows a block diagram of a known computer network topology.

FIG. 9 shows the potential architecture of the system for a two-rack scenario, for simplicity of exposition. The system is easily generalized for a larger multi-rack scenario. One or more VMs are migrated from source machine(s) in one rack to target machine(s) in another rack.

Machines in each rack together export a virtual memory device, which is essentially a logical device that aggregates the free memory space available on each machine in the rack. Within each node, the virtual memory device is exported via the block device interface, which is normally used to perform I/O operations. Such a virtualized memory device can be created using the MemX system[31], [32], [33]. See, osnet.cs.binghamton.edu/projects/memx.html, expressly incorporated herein by reference.

At the source node, memory pages of the VMs being migrated are written to the virtual memory device, which transparently scatters the pages over the network to machines in Rack 2 and keeps track of their location using a distributed hash table. These pages are also deduplicated against identical pages belonging to other VMs. The target node then reads the pages from the virtual memory device, which transparently gathers pages from other nodes on Rack 2.

Note that the scatter-gather approach can be used with both pre-copy and post-copy migration mechanisms. With pre-copy, the scatter and gather phases overlap with the iterative copy phase, enabling the latter to complete quickly, so that the source can initiate downtime earlier than it would have through traditional pre-copy. With traditional pre-copy, the source node may take a long time to initiate downtime depending upon whether the workload is read-intensive or write-intensive. With post-copy, the scatter operation allows active-push phase to quickly eliminate residual state from the source node, and the gather phase quickly transfers the memory content to the intended target host.

The scatter and gather operation can use multiple NICs at the source and target machines to perform parallel transfer of memory pages. In addition, with the availability of multi-core machines, multiple parallel threads at each node can carry out parallel reception and processing of the VM's memory pages. These two factors, combined with cluster-wide deduplication, will enable significant speedups in simultaneous migration of multiple VMs in enterprise settings.

EXAMPLE

A prototype of GMGD was implemented in the QEMU/KVM virtualization environment. The implementation is completely transparent to the users of the VMs. With QEMU/KVM, each VM is spawned as a process on a host machine. A part of the virtual address space of the QEMU/KVM process is exported to the VM as its physical memory.

A. Per-node Controllers

Per-node controllers are responsible for managing the deduplication of outgoing and incoming VMs. The controller component managing the outgoing VMs is called the source side and component managing the incoming VMs is called the target side. The controller sets up a shared memory region that is accessible only by other QEMU/KVM processes. The shared memory contains a hash table which is used for tracking identical pages. Note that the shared memory poses no security vulnerabilities because it is outside the physical memory region of the VM in the QEMU/KVM process' address space and is not accessible by the VM itself.

The source side of the per-node controller coordinates the local deduplication of memory among co-located VMs. Each QEMU/KVM process scans its VM's memory and calculates a 160-bit SHA1 hash for each page. These hash values are stored in the hash table, where they are compared against each other. A match of two hash values indicates the existence of two identical pages. Scanning is performed by a low priority thread to minimize interference with the VMs' execution. It is noted that the hash table may be used for other purposes, and therefore can be a shared resource with other facilities.

The target side of the per-node controller receives incoming identical pages from other controllers in the rack. It also forwards the identical pages received on behalf of other machines in the rack to their respective controllers. Upon reception of an identical page, the controller copies the page into the shared memory region, so that it becomes available to incoming VMs.

B. Deduplication Server

Deduplication servers are to per-node controllers what per-node controllers are to VMs. Each rack contains a deduplication server that tracks the status of identical pages among VMs that are migrating to the same target rack and the VMs already at the target rack. Deduplication servers maintain a content hash table to store this information. Upon reception of a 160-bit hash value from the controllers, the last 32-bits of the 160-bit hash are used to find a bucket in the hash table. In the bucket, the 160-bit hash entry is compared against the other entries present. If no matching entry is found, a new entry is created.

Each deduplication server can currently process up to 200,000 queries per second over a 1 Gbps link. This rate can potentially handle simultaneous VM migrations from up to 180 physical hosts. For context, common 19-inch racks can hold 44 servers of 1U (1 rack unit) height[24]. A certain level of scalability is built into the deduplication server by using multiple threads for query processing, fine-grained reader/writer locks, and batching queries from VMs to reduce the frequency of communication with the deduplication server.

Finally, the deduplication server does not need to be a separate server per rack. It can potentially run as a background process within one of the machines in the rack that also runs VMs provided that a few spare CPU cores are available for processing during migration.

C. Operations at the Source Machine

Upon initiating simultaneous migration of VMs, the controllers instruct individual QEMU/KVM processes to begin the migration. From this point onward, the QEMU/KVM processes communicate directly with the deduplication servers, without any involvement from the controllers. After commencing the migration, each QEMU/KVM process starts transmitting every page of its respective VM. For each page it checks in the local hash table whether the page has already been transferred. Each migration process periodically queries its deduplication server for the status of next few pages it is about to transfer. The responses from the deduplication server are stored into the hash table, in order to be accessible to the other co-located VMs. If the QEMU/KVM process discovers that a page has not been transferred, then it transmits the entire page to its peer QEMU/KVM process at the target machine along with its unique identifier. QEMU/KVM at the source also retrieves from the deduplication server a list of other machines in the target rack that need an identical page. This list is also sent to the target machine's controller, which then retrieves the page and sends it to the machines in the list. Upon transfer the page is marked as sent in the source controller's hash table. The QEMU/KVM process periodically updates its deduplication server with the status of the sent pages. The deduplication server also periodically updates other deduplication servers with a list of identical pages marked as sent. Dirty pages and unique pages that have no match with other VMs are transferred in their entirety to the destination.

Figure 2:
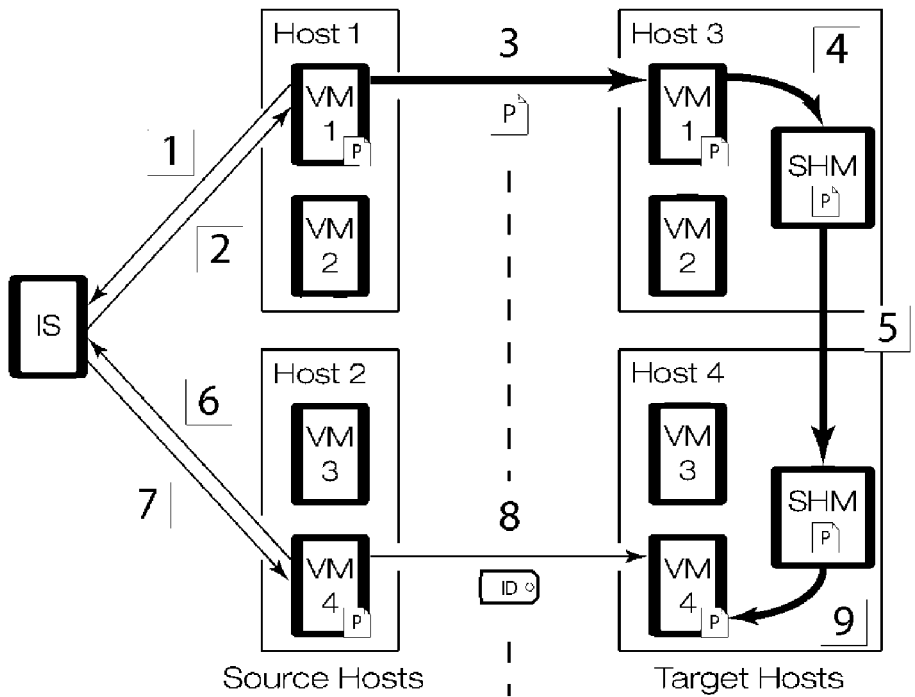
FIG. 2 shows deduplication of identical pages during migration.

FIG. 2 shows the message exchange sequence between the deduplication servers and QEMU/KVM processes for an inter-host deduplication of page P.

D. Operations at the Target Machine

On the target machine each QEMU/KVM process allocates a memory region for its respective VM where incoming pages are copied. Upon reception of an identical page, the target QEMU/KVM process copies it into the VM's memory and inserts it into the target hash table according to its identifier. If only an identifier is received, a page corresponding to the identifier is retrieved from the target hash table, and copied into the VM's memory. Unique and dirty pages are directly copied into the VMs' memory space.

E. Remote Pages

Remote pages are deduplicated pages that were transferred by hosts other than the source host. Identifiers of such pages are accompanied by a remote flag. Such pages become available to the waiting hosts in the target rack only after the carrying host forwards them. Therefore, instead of searching for such remote pages in the target hash table immediately upon reception of an identifier, the identifier and the address of the page are inserted into a per-host waiting list. A per QEMU/KVM process thread, called a remote thread, periodically traverses the list, and checks for each entry if the page corresponding to the identifier has been added into the target shared memory. The received pages are copied into the memory of the respective VMs after removing the entry from the list. Upon reception of a more recent dirtied copy of the page whose entry happens to be on the waiting list, the corresponding entry is removed from the list to prevent the thread from over-writing the page with its stale copy. The identical pages already present at the target rack before the migration are also treated as the remote pages. The per-node controllers in the target rack forward such pages to the listed target hosts. This avoids their transmission over the core network links from the source racks. However, pages dirtied by VMs running in the target rack are not forwarded to other hosts and they are requested by the corresponding hosts from their respective source hosts.

F. Downtime Synchronization

Initiating a VM's downtime before completing target-to-target transfers can increase its downtime duration. However, in the default QEMU/KVM migration technique, downtime is started at the source's discretion and the decision is made solely on the basis of the number of pages remaining to be transferred and the perceived link bandwidth at the source. Therefore, to avoid the overlap between the downtime and target-to-target transfers, a synchronization mechanism is implemented between the source and the target QEMU/KVM processes. The source QEMU/KVM process is prevented from starting the VM downtime and keep it in the live pre-copy iteration mode until all of its pages have been retrieved at the target and copied into memory. Once all remote pages are in place, the source is instructed by the target to initiate the downtime. This allows VMs to minimize their downtime, as only the remaining dirty pages at the source are transferred during the downtime.

G. Desynchronizing Page Transfers

An optimization was implemented to improve the efficiency of deduplication. There is a small time lag between the transfer of an identical page by a VM and the status of the page being reflected at the deduplication server. This lag can result in duplicate transfer of some identical pages if two largely identical VMs start migration at the same time and transfer their respective memory pages in the same order of page offsets. To reduce such duplicate transfers, each VM transfers pages in different order depending upon their assigned VM number, so as to break any synchronization with other VMs. This reduces the likelihood that identical pages from different VMs may be transferred around the same time.

Evaluation

Figure 3:
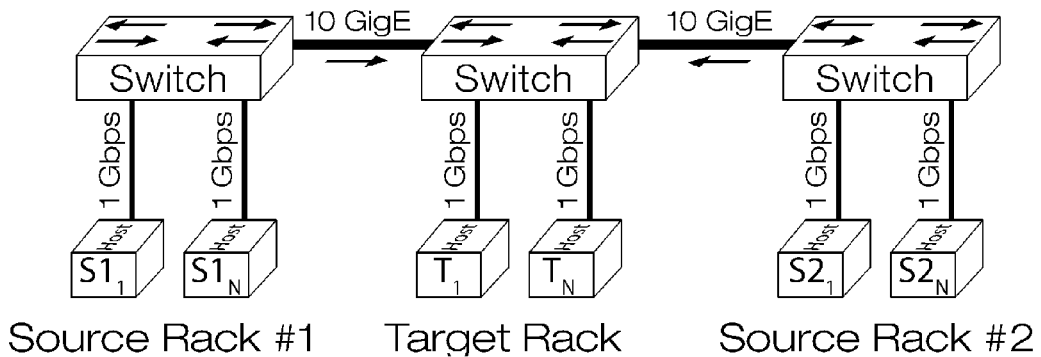
FIG. 3 shows the layout of the testbed used for evaluation.

GMGD was evaluated in a 30-node cluster testbed having high-bandwidth low-latency Gigabit Ethernet. Each physical host has two Quad core 2 GHz CPUs, 16 GB of memory, and 1 Gbps network card. FIG. 3 shows the layout of the cluster testbed consisting of three racks, each connected to a different top of rack (TOR) Ethernet switch. The TOR switches are connected to each other by a 10 GigE optical link, which acts as the core link. Although we had only the 30-node three-rack topology available for evaluation, GMGD can be used on larger topologies. Live migration of all VMs is initiated simultaneously and memory pages from the source hosts traverse the 10 GigE optical link between the switches to reach the target hosts. For most of the experiments, each machine hosts four VMs and each VM has 2 virtual CPUs (VCPUs) and 1 GB memory. We compare GMGD against the following VM migration techniques.

(1) Online Compression (OC):

This is the default VM migration technique used by QEMU/KVM. Before transmission, it compresses pages that are filled with uniform content (primarily pages filled with zeros) by representing the entire page with just one byte. At the target, such pages are reconstructed by filling an entire page with the same byte. Other pages are transmitted in their entirety to the destination.

(2) Gang Migration With Local Deduplication (GMLD):

This technique uses content hashing to deduplicate the pages across VMs co-located on the same host[8]. Only one copy of identical pages is transferred from the source host.

In initial implementations of GMGD prototype, the use of online hashing was considered, in which hash computation and deduplication are performed during migration (as opposed to before migration). Hash computation is a CPU-intensive operation. In the evaluations, it was found that the online hashing variant performed very poorly, in terms of total migration time, on high-bandwidth low-delay Gigabit Ethernet. For example, online hashing takes 7.3 seconds to migrate a 1 GB VM and 18.9 seconds to migrate a 4 GB VM, whereas offline hashing takes only 3.5 seconds and 4.5 seconds respectively. CPU-heavy online hash computation became a serious performance bottleneck and, in fact, yielded worse total migration times than even the simple OC technique described above. Given that the total migration time of online hashing variant is considerably worse than offline hashing, but the savings in network traffic are just comparable, the results for online hashing are omitted in the reports of experiments below.

A. Network Load Reduction

Figure 4:
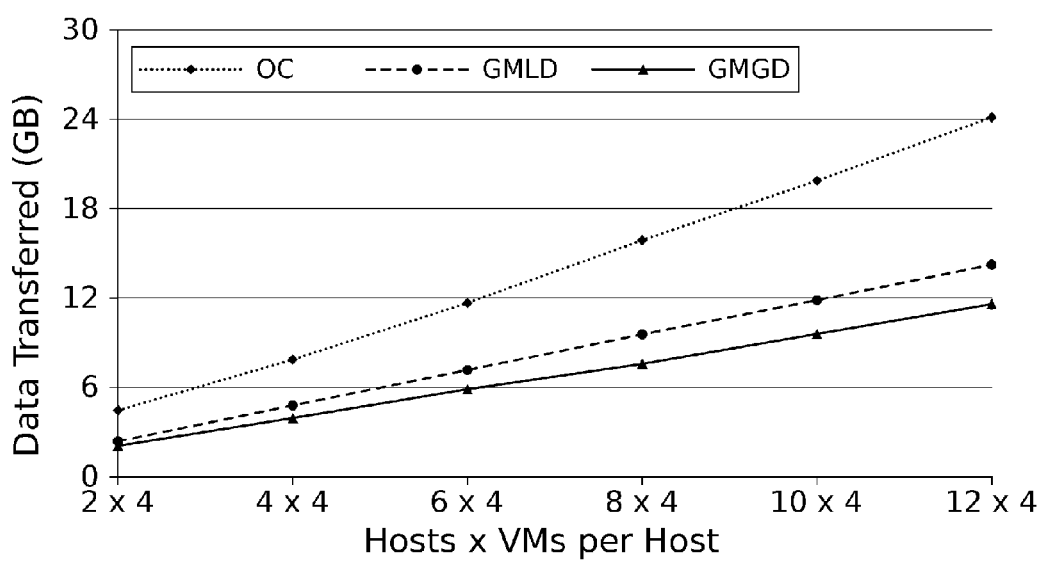
FIG. 4 illustrates network traffic on core links when migrating idle VMs.

1) Idle VMs: Here an equal number of VMs are migrated from each of the two source racks, i.e., for 12×4 configuration, 4 VMs are migrated from each of the 6 hosts on each source rack. FIG. 4 shows the amount of data transferred over the core links for the three VM migration schemes with an increasing number of hosts, each host running four 1 GB idle VMs. Since OC only optimizes the transfer of uniform pages, a set that mainly consists of zero pages, it transfers the highest amount of data. GMLD also deduplicates zero pages in addition to the identical pages across the co-located VMs. As a result, it sends less data than OC. GMGD transfers the lowest amounts of data. For 12 hosts, GMGD shows more than 51%, and 19% decrease in the data transferred through the core links over OC and GMLD respectively.

Figure 5:
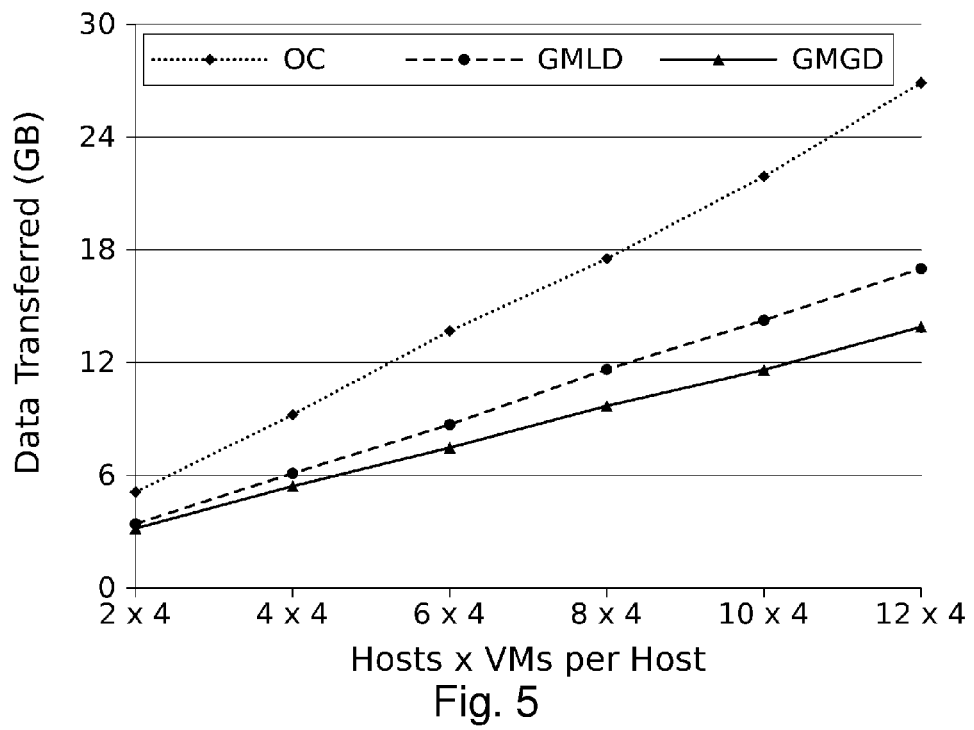
FIG. 5 illustrates network traffic on core links when migrating busy VMs.

2) Busy VMs: To evaluate the effect of busy VMs on the amount of data transferred during their migration, Dbench[6], a filesystem benchmark, was run inside VMs. Dbench performs file I/O on a network attached storage. It provides an adversarial workload for GMGD because it uses the network interface for communication and DRAM as a buffer. Dbench was modified to write random data, hence its memory footprint consisted of unique pages that cannot be deduplicated. Also the execution of Dbench was initiated after the deduplication phase of GMGD to ensure that the memory consumed by Dbench was not deduplicated. The VMs are migrated while execution of Dbench is in progress. FIG. 5 shows that GMGD yields a 48% reduction in the amount of data transferred over OC and 18% reduction over GMLD.

B. Total Migration Time

1) Idle VMs: To measure the total migration time of different migration techniques, the end-to-end (E2E) total migration time is measured, i.e. the time taken from the start of the migration of the first VM to the end of the migration of the last VM. Cluster administrators are concerned with E2E total migration time of groups of VMs since it measures the time for which the migration traffic occupies the core links. The idle VM section of Table I shows the total migration time for each migration technique with an increasing number of hosts containing idle VMs. Note that even with the maximum number of hosts (i.e. 12 with 6 from each source rack), the core optical link remains unsaturated. Therefore, for each migration technique nearly constant total migration time is observed, irrespective of the number of hosts. Further, among all three techniques, OC has highest total migration time for any number of hosts, which is proportional to the amount of data it transfers. GMGD's total migration time is slightly higher than that of GMLD, approximately 4% higher for 12 hosts.

The difference between the total migration time of GMGD and GMLD can be attributed to the overhead associated with GMGD for performing deduplication across the hosts. While the migration is in progress, it queries with the deduplication server to read, or update the status of deduplicated pages. Such requests need to be sent frequently to perform effective deduplication.

2) Busy VMs: Table I shows that Dbench equally increases the total migration time of all the VM migration techniques as compared to their total migration time with idle VMs. However, a slight reduction in the total migration time is observed with an increasing number of hosts. With a lower number of hosts (and therefore a lower number of VMs), the incoming 1 Gbps Ethernet link to the network attached storage server might remain unsaturated, and therefore each Dbench instance can perform I/O at a faster rate compared to a scenario with more VMs, where the VMs must contend for the available bandwidth. The faster I/O rate results in higher page dirtying rate, resulting in more data being transferred during VMs' migration.

C. Downtime

Figure 6:
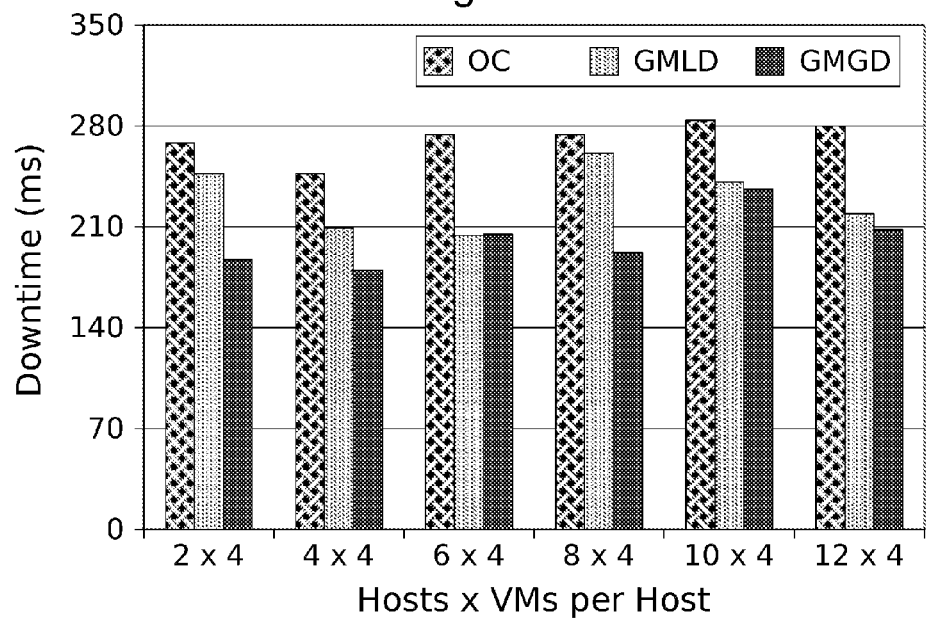
FIG. 6 shows a downtime comparison.

FIG. 6 shows that increasing the number of hosts does not have a significant impact on the downtimes for all three schemes. This is because each VM's downtime is initiated independently of other VMs. However, the downtime for OC is slightly higher, in the range of 250 ms to 280 ms.

D. Background Traffic

With the three-rack testbed used in the above experiments, the core links remain uncongested due to limited number of hosts in each source rack. To evaluate the effect of congestion at core links, for the remaining experiments a 2-rack topology was used, consisting of one source rack and one target rack, each containing 10 hosts. With this layout, migration of VMs from 10 source hosts is able to saturate the core link between the TOR switches.

The effect of background network traffic on different migration techniques was investigated. Conversely, the effect of different migration techniques on other network-bound applications in the cluster was compared. For this experiment, the 10 GigE core link between the switches was saturated with VM migration traffic and background network traffic. 7 Gbps of background dNetperf[2] UDP traffic was transmitted from the source rack to the target rack such that it competes with the VM migration traffic on the core link.

Figure 7:
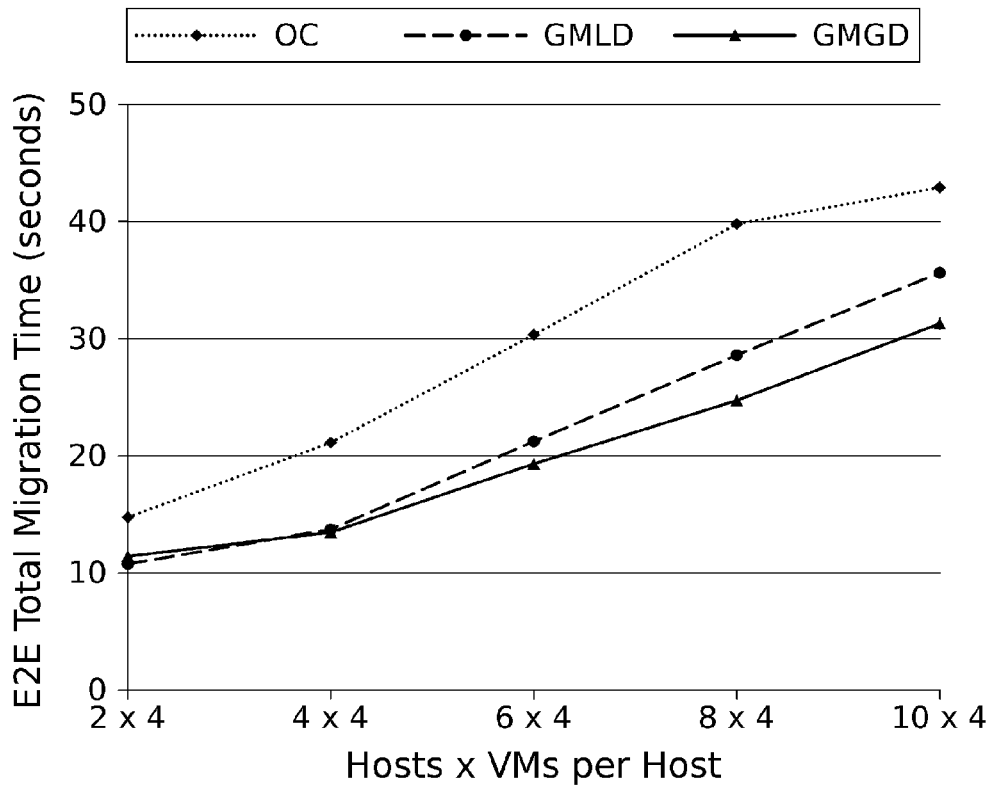
FIG. 7 shows the total migration time with background traffic.
Figure 8:
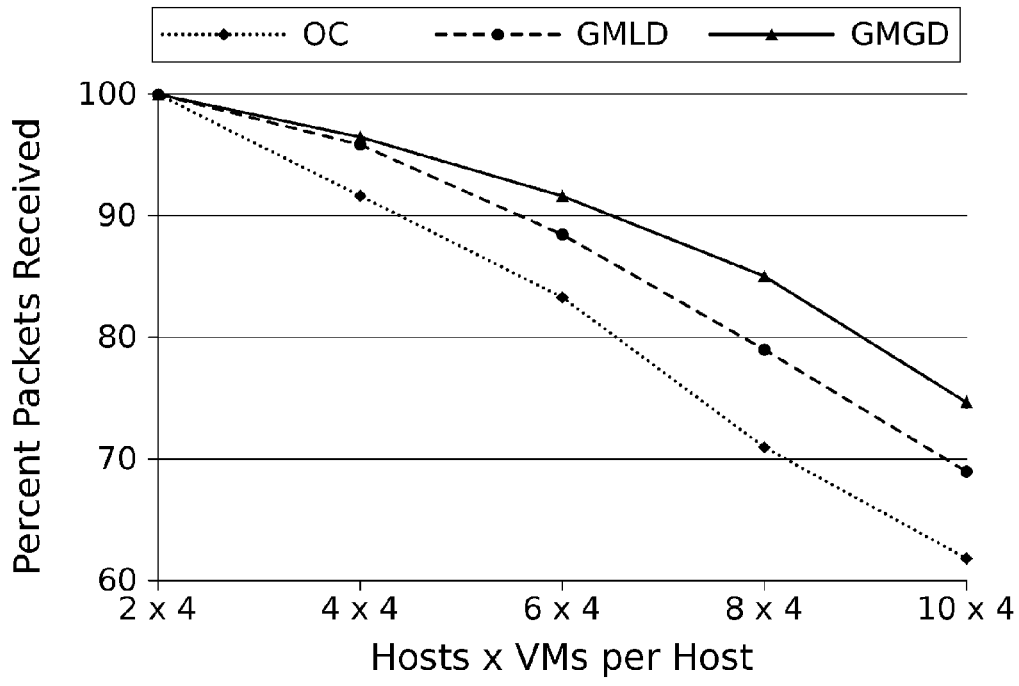
FIG. 8 shows background traffic performance with gang migration.

FIG. 7 shows the comparison of total migration time with UDP background traffic for the aforementioned setup. With an increasing number of VMs and hosts, the network contention and packet loss on the 10 GigE core link also increases. A larger total migration time for all three techniques was observed as compared to the corresponding idle VM migration times listed in Table I. However, observe that GMGD has lower total migration time than both OC and GMLD, in contrast to Table I where GMGD had higher TMT compared to GMLD This is because, in response to packet loss at the core link, all VM migration sessions (which are TCP flows) backoff. However, the backoff is proportional to the amount of data transmitted by each VM migration technique. Since GMGD transfers less data, it suffers less from TCP backoff due to network congestion and completes the migration faster. FIG. 8 shows the converse effect, namely, the impact of VM migration on the performance of Netperf. With an increasing number of migrating VMs, Netperf UDP packet losses increase due to network contention. For 10 hosts, GMGD receives 13% more packets than OC and 5.7% more UDP packets than GMLD.

E. Application Degradation

Table II compares the degradation of applications running inside the VMs during migration using 10×4 configuration.

NFS I/O Benchmark: VMs images are often stored on a network attached storage, which can be located outside the rack hosting the VMs. Any I/O operations from VMs traverse one or more switches before reaching the storage server. Here the impact of migration on the performance of I/O operations from VMs in the above scenario is evaluated. Two NFS servers are hosted on two machines located outside the source rack, and each connected to the switch with 1 Gbps Ethernet link. Each VM mounts a partition from one of the NFS servers, and runs a 75 MB sequential file write benchmark. The migration of VMs is carried out while the benchmark is in progress, and the effect of migration on the performance of the benchmark is observed. Since, at the source network interface, the NFS traffic interferes with the migration traffic, the benchmark shows degradation proportional to the amount of data the migration technique transfers. Table II shows the NFS write bandwidth per VM. GMGD yields the smallest reduction in observed bandwidth among the three.

TCP RR: Netperf TCP RR VM workload was used to analyze the effect of VM migration on the inter-VM communication. TCP RR is a synchronous TCP request-response test. 20 VMs from 5 hosts are used. as senders, and 20 VMs from the other 5 hosts as receivers. The VMs are migrated while the test is in progress and measure the performance of TCP RR. Figures in Table II show the average transaction rate per sender VM. Due to the lower amount of data transferred through the source NICs, GMGD keeps the NICs available for the inter-VM TCP RR traffic. Consequently, it least affects the performance of TCP RR and gives the highest number of transactions per second among the three.

Sum of Subsets: is a CPU-intensive workload that, given a set of integers and an integer k, finds a non-empty subset that sum to k. This program is run in the VMs during their migration to measure the average per-VM completion time of the program. Although GMGD again shows the least adverse impact on the completion time, the difference is insignificant due to the CPU-intensive nature of the workload.

F. Performance Overheads

Duplicate Tracking: Low priority threads perform hash computation and dirty-page logging in the background. With 4 VMs and 8 cores per machine, a CPU-intensive workload (sum of subsets) experienced an 0.34% overhead and a write-intensive workload (random writes to memory) experienced a 1.99% overhead. With 8 VMs per machine, the overheads were 5.85% and 3.93% respectively, primarily due to CPU contention.

Worst-case workload: GMGD does not introduce any additional overheads, compared against OC and GMLD, when running worst-case workloads. VMs run a write-intensive workload that reduces the likelihood of deduplication by modifying 1.7 times as much data as the sire of each VM. All the three techniques show no discernible performance difference in terms of total migration time, data transferred, and application degradation.

Space overhead: In the worst case, when all pages are unique, the space overhead for storing the deduplication data structures in each host is 4.3% of the total memory of all VMs.

Hardware Overview

FIG. 8 (see U.S. Pat. No. 7,702,660, issued to Chan, expressly incorporated herein by reference), shows a block diagram that illustrates a computer system 400. Computer system 400 includes a bus 402 or other communication mechanism for communicating information, and a processor 404 coupled with bus 402 for processing information. The processor may be a multicore processor, and the computer system may be duplicated as a cluster of processors or computing systems. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions. The computer system 400 may host a plurality of virtual machines (VMs), which each act as a complete and self-contained computing environment for the software and user interaction, while sharing physical resources.

Computer system 400 may be coupled via bus 402 to a display 412, such as a liquid crystal display monitor, for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. In a server environment, typically the user interface for an administrator is provided remotely through a virtual terminal technology, though the information from the physical communications ports can also be communicated remotely.

The techniques described herein may be implemented through the use of computer system 400, which will be replicated for the source and destination cluster, and each computer system 400 will generally have a plurality of server "blades". According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion, and is tangible and non-transitory. In an embodiment implemented using computer system 400, various machine-readable media are involved, for example, in providing instructions to processor 404 for execution. Such a medium may take many forms, including but not limited to, non-volatile media, and volatile media, which may be local or communicate through a transmission media or network system. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a hard disk or any other magnetic medium, a DVD or any other optical medium, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 404 for execution. For example, the instructions may initially be carried on a magnetic disk or solid state storage media of a remote computer. The remote computer can load the instructions into its dynamic memory. Bus 402 carries the data to main memory 406, from which processor 404 retrieves and executes the instructions. The instructions received by main memory 406 may optionally be stored on storage device 410.

Computer system 400 also includes a communication interface 418 coupled to bus 402. Communication interface 418 provides a two-way data communication coupling to a network link 420 that is connected to a local network 422. For example, communication interface 418 may be a 10 Gigabit Ethernet port to provide a data communication connection to switch or router. The Ethernet packets, which maybe jumbo packets (e.g., 8k) can be routed locally within a data center using TCP/IP or in some cases UDP or other protocols, or externally from a data center typically using TCP/IP protocols. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426 or to an Internet 428 backbone communication link. In the case where an ISP 426 is present, the ISP 426 in turn provides data communication services through the world wide packet data communication network now commonly referred to as the Internet 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The information received is stored in a buffer memory and may be communicated to the processor 404 as it is received, and/or stored in storage device 410, or other non-volatile storage.

U.S. 2012/0173732, expressly incorporated herein by reference, discloses various embodiments of computer systems, the elements of which may be combined or subcombined according to the various permutations.

It is understood that this broad invention is not limited to the embodiments discussed herein, but rather is composed of the various combinations, subcombinations and permutations thereof of the elements disclosed herein, including aspects disclosed within the incorporated references. The invention is limited only by the following claims

REFERENCES

Each of the following references is each expressly incorporated herein by reference in its entirety.

[1] A. Arcangeli, I. Eidus, and C. Wright. Increasing memory density by using ksm. In *Proc. of Linux Symposium*, July 2009.

[2] Netperf: Network Performance Benchmark. www.netperf.org/netperf.

[3] Edouard Bugnion, Scott Devine, and Mendel Rosenblum. Disco: Running commodity operating systems on scalable multiprocessors. In *ACM Transactions on Computer Systems*, October 1997.

[4] F. Chabaud and A. Joux. Differential collisions in sha-0. In *Proc. of Annual International Cryptology Conference*, August 1998.

[5] C. Clark, K. Fraser, S. Hand, J. G. Hansen, E. Jul, C. Limpach, I. Pratt, and. A. Warfield. Live migration of virtual machines. In *Proc. of Network System Design and Implementation*, May 2005.

[6] Dbench. samba.org/ftp/tridge/dbench.

[7] U. Deshpande, U. Kulkarni, and K. Gopalan. Inter-rack live migration of multiple virtual machines. In *Proc. of Workshop on Virtualization Technologies in Distributed Computing* (to appear), June 2012.

[8] U. Deshpande, X. Wang, and. K. Gopalan. Live gang migration of virtual machines. In *High Performance Distributed Computing*, June 2010.

[9] 10-Gigabit Ethernet. en.wikipedia.org/wiki/10 gigabit ethernet.

[10] Gigabit Ethernet. en.wikipedia.org/wiki/gigabit ethernet.

[11] D. Gupta, S. Lee, M. Vrable, S. Savage, A. C Snoeren, G. Varghese, G. M Voelker, and A. Vandat. Difference engine: Harnessing memory redundancy in virtual machines. In *Proc. of Operating Systems Design and Implementation*, December 2010.

[12] OpenSSL SHA1 hash. www.openssl.org/docs/crypto/sha.html.

[13] M. Hines, U. Deshpande, and K. Gopalan. Post-copy live migration of virtual machines. *Operating Syst. Review*, 43(3):14-26, July 2009.

[14] W. Huang, Q. Gao, Liu, and D. K. Panda. High performance virtual machine migration with RDMA over modern interconnects. In *Proc. of IEEE International Conference on Cluster Computing*, 2007.

[15] Infiniband. en.wikipedia.org/wiki/infiniband.

[16] H. Jin, L. Deng, S. Wu, X. Shi, and X. Pan. Live virtual machine migration with adaptive, memory compression. In *Proc. of Cluster Computing and Workshops*, August 2009.

[17] Samer Al Kiswany, Dinesh Subhraveti, Prasenjit Sarkar, and Matei Ripeanu. Vmflock: Virtual machine co-migration for the cloud. In *Proc. of High Performance Distributed Computing*, June 2011.

[18] A. Kivity, Y. Kamay, D. Laor, U. Lublin, and A. Liguori. Kvm: The linux virtual machine monitor. In *Proc. of Linux Symposium*, June 2007.

[19] G. Milos, D. G. Murray, S. Hand, and M. A. Fetterman. Satori: Enlightened page sharing. In *USENIX Annual Technical Conference*, 2009.

[20] M. Nelson, B. H Lim, and G. Hutchins. Fast transparent migration for virtual machines. In *USENIX Annual Technical Conference*, April 2005.

[21] A. Nocentino and P. M. Ruth. Toward dependency-aware live virtual machine migration. In *Proc. of Virtualization Technologies in Distributed Computing*, June 2009.

[22] P. Riteau, C. Morin, and T. Triol. Shrinker: Improving live migration of virtual clusters over vans with distributed data deduplication and content-based addressing. In *Proc. of EUROPAR*, September 2011.

[23] C. P Sapuntzakis, R. Chandra, B. Pfaff, J. Chow, M. S Lam, and M. Rosenblum, Optimizing the migration of virtual computers. In *Proc. of Operating Systems Design and Implementation*, December 2002.

[24] Rack Unit. en.wikipedia.org/wiki/rack unit.

[25] C. A. Waldspurger. Memory resource management in VMware ESX server. In *Operating Systems Design and Implementation*, December 2002.

[26] J. Wang, K. L. Wright, and K. Gopalan. XenLoop: a transparent high performance inter-vm network loopback. In *Proc. of High performance distributed computing*, June 2008.

[27] T. Wood, K. K. Ramakrishnan, P. Shenoy, and J. Van Der Merwe. Cloudnet: dynamic pooling of cloud resources by live wan migration of virtual machines. In *Virtual Execution Environments*, March 2011.

[28] T. Wood, G. Tarasuk-Levin, P. Shenoy, P. Desnoyers, E. Cecchet, and M. D. Corner. Memory buddies: exploiting page sharing for smart colocation in virtualized data centers. In *Proc. of Virtual Execution Environments*, March 2009.

[29] L. Xia and P. A. Dinda. A case for tracking and exploiting internode and intra-node memory content sharing in visualized large-scale parallel systems. In *Proceedings of the 6th international workshop on Virtualization Technologies in Distributed Computing Date*, pages 11-18. ACM, 2012.

[30] X. Zhang, Z. Huo, J. Ma, and D. Meng. Exploiting data deduplication to accelerate live virtual machine migration. In *Proc. of International Conference on Cluster Computing*, September 2010.

[31] Umesh Deshpande, Beilan Wang, Shafee Haque, Michael Hines, and Kartik Gopalan, MemX: Virtualization of Cluster-wide Memory, In Proc. of 39th International Conference on Parallel Processing (ICPP), San Diego, Calif., USA, September 2010.

[32] Michael Hines and Kartik Gopalan, MemX: Supporting Large Memory Workloads in Xen Virtual Machines, In Proc. of the International Workshop on Virtualization Technology in Distributed Computing (VTDC), Reno, N.V., November 2007.

[33] Michael Hines, Jian Wang, Kartik Gopalan, Distributed Anemone: Transparent Low-Latency Access to Remote Memory in Commodity Clusters, In Proc. of the International Conference on High Performance Computing (HiPC), December 2006.

TABLE I

Total migration time (in seconds)

| | Total migration time (seconds) | | | | | |
|---|---|---|---|---|---|---|
| | Idle VMs | | | Busy VMs | | |
| Hosts × VMs | OC | GMLD | GMGD | OC | GMLD | GMGD |
| 2 × 4 | 18.98 | 10.96 | 10.61 | 25.87 | 17.12 | 17.40 |
| 4 × 4 | 18.23 | 11.70 | 11.8 | 23.45 | 15.64 | 15.98 |
| 6 × 4 | 18.67 | 11.21 | 11.56 | 21.97 | 14.92 | 15.07 |
| 8 × 4 | 18.26 | 11.31 | 11.25 | 20.98 | 14.13 | 14.37 |
| 10 × 4 | 18.7 | 11.16 | 12.05 | 21.90 | 14.13 | 14.9 |
| 12 × 4 | 19.10 | 11.48 | 12.00 | 21.65 | 14.05 | 14.09 |

TABLE II

Application degradation in migrating 40 VMs

| Benchmarks | W/o Migration | OC | GMLD | GMGD |
|---|---|---|---|---|
| NFS (Mbps/VM) | 48.08 | 34.52 | 36.93 | 44.82 |
| TCP-RR (trans/sec) | 1180 | 232.36 | 280.41 | 419.86 |
| Sum of Subsets (sec) | 32.32 | 33.045 | 33.77 | 32.98 |

What is claimed is:

1. A method for gang migration with global deduplication, comprising:
   providing a datacenter comprising:
      a first plurality of virtual machines in a first cluster having a first controller, defined by a first set of information residing in a first storage medium,
      a second cluster having a second controller, defined by a second set of information residing in a second storage medium,
      the first cluster and the second cluster each communicating with each other through respective communication ports to at least one data communication network;
   maintaining a first hash table of the memory pages of the first storage medium and a second hash table of the memory pages of the second storage medium;
   performing a first cluster-wide deduplication of the first plurality of virtual machines, to identify first redundant memory pages of the first storage medium representing the respective virtual machines of the first cluster that have corresponding memory page content to each other based on at least the hashing of the memory pages;
   tracking memory pages in the first storage medium that have changed content after hashing;
   periodically exchanging the first and second hash tables between the first cluster and the second cluster through the at least one communication network;
   initiating a simultaneous live migration of the first plurality of virtual machines, by communicating information to reconstitute the first plurality of virtual machines as a second plurality of virtual machines in the second cluster defined by a second set of information residing in a second storage niedium, through the at least one data communication network, after at least one exchange of the first and second hash tables;
   receiving at least one memory page by the second cluster from a third cluster distinct from the first and second clusters, and updating the periodically exchanged second hash table to reflect the received at least one memory page from the third cluster;
   based on the identification of the first redundant memory pages, the periodically exchanged first and second hash tables, and tracked memory pages that have changed content after hashing, selectively communicating information representing the unique memory pages of the first storage medium that are not already present in the second storage medium through the at least one communication network to the second storage medium without communicating more than one copy of unchanged redundant memory pages of the first storage medium or any copy of a memory page already in the second storage medium, and updating the periodically exchanged second hash table to reflect the communicated unique memory pages from the first cluster; and
   subsequent to communication of the information representing the unique memory pages of the first storage medium through the at least one communication network, duplicating within the second cluster by the second controller, the redundant memory pages of the first storage medium and memory pages already in the second storage medium required for the second plurality of virtual machines, to reconstitute the second plurality of virtual machines within the second cluster.

2. The method according to claim 1, wherein the first cluster comprises a first rack, the second cluster comprises a second rack, each of the first and second racks has a top-of-the-rack switch which manages communications through the through at least one data communication network, wherein the at least one data communication network has a bandwidth of at least 1 Gbps.

3. The method according to claim 1, wherein the first hash table and the second hash table comprise a respective 160 bit hash for each respective memory page.

4. The method according to claim 1, wherein the tracking memory pages in the first storage medium that have changed content after hashing comprises providing a hypervisor configured to control a respective virtual machine, mark all memory pages of a respective virtual machine as write-only after hashing, maintain a shadow page table, trap a first write attempt to a respective memory page, update the shadow page table after the first write attempt to reflect the change, and permit the write attempt to proceed.

5. The method according to claim 1, wherein the second cluster is configured to receive a third hash table from the third cluster, and to r a memory page from he third cluster that is also present on the first cluster.

6. The method according to claim 1, wherein the first controller maintains a page status for each memory page, and updates the page status for a respective memory page when the memory page is sent from the first cluster to the second cluster.

7. The method according to claim 1, wherein the first controller resides within a respective virtual machine on the first cluster and the second controller resides within a respective virtual machine on the second cluster.

8. The method according to claim 7, wherein the first controller comprises has a memory space in a shared memory region which is inaccessible to the first plurality of virtual machines of the first cluster, and the first controller has access to the first set of information residing in a first storage medium.

9. The method according to claim 8, wherein the first controller calculates the first hash table from the first set of information residing in a first storage medium.

10. The method according to claim 1, wherein the first cluster further comprises a deduplication server, a third controller and a third plurality of virtual machines, wherein the first controller calculates the first hash table from the first set of information residing in a first storage medium for the first plurality of virtual machines, the third controller calculates a third hash table from a third set formation residing in a third storage medium for the third plurality of virtual machines, and the deduplication server maintains a fourth hash table representing a composite of the first hash table and the third hash table, and an indication of duplicate memory pages within the first storage medium and the third storage medium.

11. A system for gang migration with global deduplication, in a datacenter comprising a plurality of virtual machines in a first cluster defined by a set information residing in a first storage medium, the first cluster communicating through at least one data communication network, comprising:
   at least one first memory configured to store a first hash table representing hash values for memory pages of the first storage medium;
   at least one second memory configured to store a second hash table representing hash values of memory pages of a second cluster, distinct from the first cluster;
   at least one third memory configured to store an indication that a respective memory page of the first storage medium has a changed content since a prior hash value for the respective memory page was calculated;
   at least one processor configured to perform cluster-wide deduplication of the plurality of virtual machines of the first cluster to identify redundant memory pages of the first storage medium representing the respective virtual machines that have corresponding content;
   at least one communication link configured to communicate through the at least one communication network, to:
      periodically communicate the first hash table from the at least one first memory to the second cluster and to receive the second hash from the second cluster through the at least one data communication network to the at least one second memory: and
      perform a simultaneous live migration of the plurality of virtual machines in the first cluster, by communicating information for reconstituting the plurality of virtual machines to the second cluster defined by a set of information residing in a second storage medium;
   the at least one processor being further configured, based on the identification of the redundant memory pages having corresponding content, the at least one second memory, and at least one third memory, to selectively communicate information representing the unique memory pages of the first storage medium not present on the second storage medium, through the at least one communication network to the second storage medium, without communicating redundant copies and memory pages having unchanged content of the memory pages of the first storage medium.

12. The system according to claim 11, wherein the first cluster comprises a first rack, the second cluster comprises a second rack, each of the first and second racks has a top-of-the-rack switch which manages communications through the through at least one data communication network, wherein the at least one data communication network has a bandwidth of at least 1 Gbps.

13. The system according to claim 11, wherein the first hash table and the second hash table comprise a respective 160 bit hash for each respective memory page.

14. The system according to claim 11, wherein the third memory has a content defined by a hypervisor configured to control a respective virtual machine, mark all memory pages of a respective virtual machine as write-only after hashing, maintain a shadow page table, trap a first write attempt to a respective memory page, update the shadow page table after the first write attempt to reflect the change, and permit the write attempt to proceed.

15. The system according to claim 11, wherein the second cluster is configured to receive a third hash table from a third cluster, and to request a memory page from the third cluster that is also present on the first cluster.

16. The system according to claim 11, wherein the first cluster comprises a first controller configured to maintain a page status for each memory page, and to update the page status for a respective memory page when the memory page is sent from the first cluster to the second cluster.

17. The system according to claim 11, further comprising a first controller which resides within a respective virtual machine on the first cluster and a second controller which resides within a respective virtual machine on the second cluster, wherein the first controller comprises has a memory space in a shared memory region which is inaccessible to the first plurality of virtual machines of the first cluster, and the first controller has access to the first set of information residing in a first storage medium to generate the first hash table.

18. The system according to claim 11, wherein an order of transmission of respective memory pages of the plurality of virtual machines is dependent on respective virtual machine identifier.

19. The system according to claim 11, wherein the first cluster further comprises a first controller, a deduplication server, a third controller and a third plurality of virtual machines, wherein:
   the first controller is configured to calculate the first hash table from the first set of information residing in a first storage medium for the first plurality of virtual machines,
   the third controller is configured to calculate a third hash table from a third set of information residing in a third storage medium for the third plurality of virtual machines, and
   the at least one processor is configured to implement the deduplication server configured to maintain a fourth hash table representing a composite of the first hash table and the third hash table, and an indication of duplicate memory pages within the first storage medium and the third storage medium.

20. A method for migration of virtual machines with global deduplication, comprising:
   providing a plurality of virtual machines having an active status for processing workload at a local facility, defined by a set of stored information comprising redundant portions, the network being interconnected with a wide area network;
   identifying at least a subset of the redundant portions of the stored information;
   generating a hash table of hashes of respective memory pages of the plurality of virtual machines, and maintaining a list of respective memory pages that have changed content after the respective hash is generated;
   periodically transmitting the generated hash table, and periodically receiving a remote hash table from a remote location providing an identifier of content of pages present at the remote location, through the wide area network:
   initiating a simultaneous migration of the plurality of virtual machines by communicating through the wide area network to the remote location information for reconstituting the plurality of virtual machines at the remote location from:

information comprising portions of the set of stored information that are not identified as the redundant portions, and portions of the stored information whose content has changed after the respective hash is generated, and excluding redundant copies of the subset of the redundant portions of the stored information and information already present at the remote location;

receiving at a remote location the data to reconstitute the plurality of virtual machines;

duplicating the subset of the redundant portions of the stored information to reconstitute the set of stored information defining the plurality of virtual machines and the information already present at the remote location; and transferring the active status from the plurality of virtual machines to the reconstituted plurality of virtual machines at the remote location, such that the reconstituted plurality of virtual machines at the remote location assume processing of the workload from the plurality of virtual machines at the local facility.

* * * * *